United States Patent

[11] 3,582,884

[72] Inventor David H. Shepard
Rye, N.Y.
[21] Appl. No. 701,670
[22] Filed Jan. 30, 1968
[45] Patented June 8, 1971
[73] Assignee Congnitronics Corporation
Mount Kisco, N.Y.
Continuation-in-part of application Ser. No. 523,367, Jan. 27, 1966, now abandoned.

[54] READING MULTIPLE-SCANNER CHARACTER SYSTEM

17 Claims, 12 Drawing Figs.

[52] U.S. Cl. .......... 340/146.3, 178/6, 178/7.1, 340/149, 340/172.5
[51] Int. Cl. .......... G06k 9/10, H04n 1/00
[50] Field of Search .......... 340/146.3, 149, 150, 151, 152, 172.5, 182, 183; 178/1, 2, 3, 4.1, 6, 7.1, 7.3, 11, 17,

[56] References Cited
UNITED STATES PATENTS

| | | | |
|---|---|---|---|
| 2,922,840 | 1/1960 | Lally | (178/6UX) |
| 3,029,414 | 4/1962 | Schrimpf | 340/172.5 |
| 3,200,194 | 8/1965 | Rabinow | 178/6 |
| 3,225,334 | 12/1965 | Fields et al. | 340/172.5 |
| 3,259,883 | 7/1966 | Rabinow et al. | 340/146.3 |
| 3,271,728 | 9/1966 | Kamentsky | 340/146.3 |
| 3,347,981 | 10/1967 | Kagan et al. | 178/6X |

*Primary Examiner*—Maynard R. Wilbur
*Assistant Examiner*—Leo H. Boudreau
*Attorney*—Bryan, Parmelee, Johnson & Bollinger

ABSTRACT: A system comprising a central station having data processing apparatus with a common data buss arrangement interconnecting a data processor with its peripheral devices including a number of incoming data buffers. A plurality of remote desk top scanner units are connected to the central station, each being arranged to receive a document bearing graphic characters and to scan the characters on the document with an optical light beam so as to sweep the character area in a series of adjacent paths. Each remote scanner has means to develop scan signals representing the light reflected from the scanned document and to produce binary code groups indicating the scan distances between certain selected events such as white-to-black transitions. The code groups from each remote scanner are transmitted to a respective data buffer at the central station and subsequently are decoded to reconstruct the original video scan data in a form suitable for deciphering by character recognition means so as to identify the individual characters of the document. The central data processing apparatus, including decoding and character recognition means, operates on a time-sharing basis to service all of the remote units.

INVENTOR
David H. Shepard
BY
Robertson, Bryan, Parmelee + Johnson
ATTORNEYS

READING MULTIPLE-SCANNER CHARACTER SYSTEM

This application is a continuation-in-part of my copending application Ser. No. 523,367, filed Jan. 27, 1966, and now abandoned. The invention relates primarily to sensing and recognition of graphic characters. In another aspect, the invention relates to improved techniques for transmitting graphic symbol material between remote points.

In a preferred embodiment to be described herein, there is provided a Remote Optical Character Recognition System incorporating means for scanning documents optically and producing corresponding electrical signals for transmission to a central station for recognition of individual characters for subsequent processing.

Although character recognition equipment of various types has been available for a number of years, the relatively high cost of construction and operation of such equipment has tended to limit its use to special applications, such as where there is a large continuous volume of document reading, or where the end result is so vital that high cost is justified. There are numerous other applications where character reading equipment could make valuable contributions to system effectiveness, but only if the overall cost of the character reading was significantly less than that of currently available conventional apparatus.

Accordingly, it is a general object of this invention to provide character recognition systems, apparatus and techniques which are superior to those available heretofore. A related general object is to provide improved arrangements for sending between distant points specialized communications such as those representing graphic character data and the like.

A specific object of this invention is to provide a character reading system arrangement which permits efficient use of complex and costly facilities. Other objects, aspects and advantages of this invention will in part be pointed out in, and in part apparent from the following description considered together with the accompanying drawings, in which:

FIG. 1A and 1B, when joined, provide a pictorial representation of a character reading system incorporating the present invention;

Figure 10:
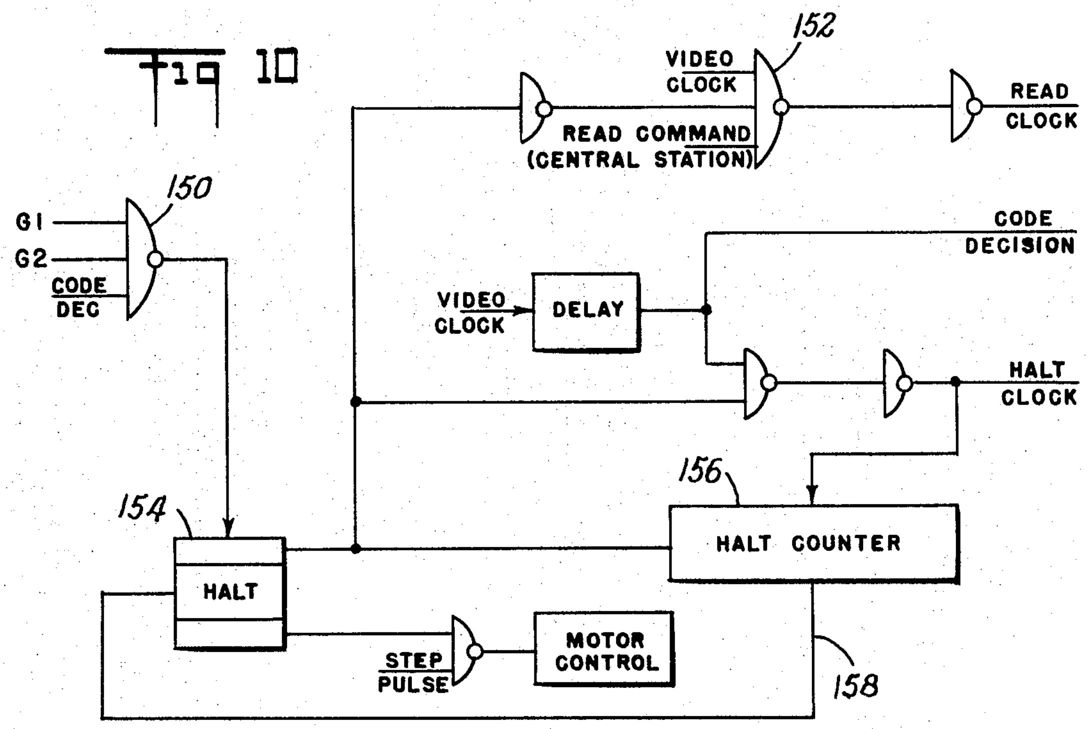
Figure 11:
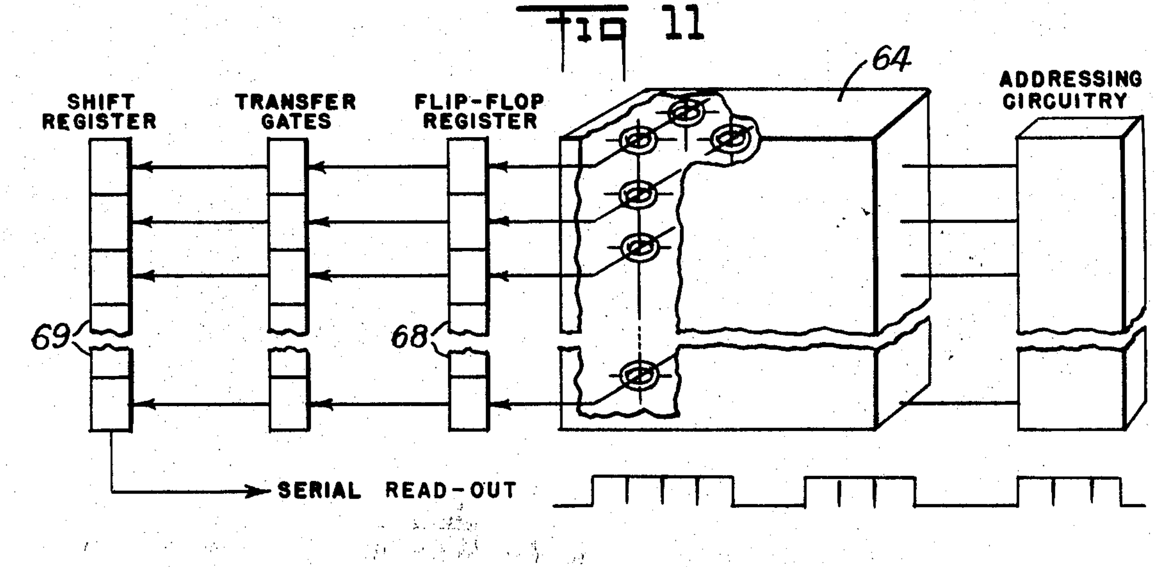

FIGS. 5—10 show illustrative circuit arrangements for carrying out logic operations incident to encoding the scan data for transmission to the central station; and FIG. 11 shows the magnetic core assembly, used for decoding, together with the readout registers.

Figure 1A:
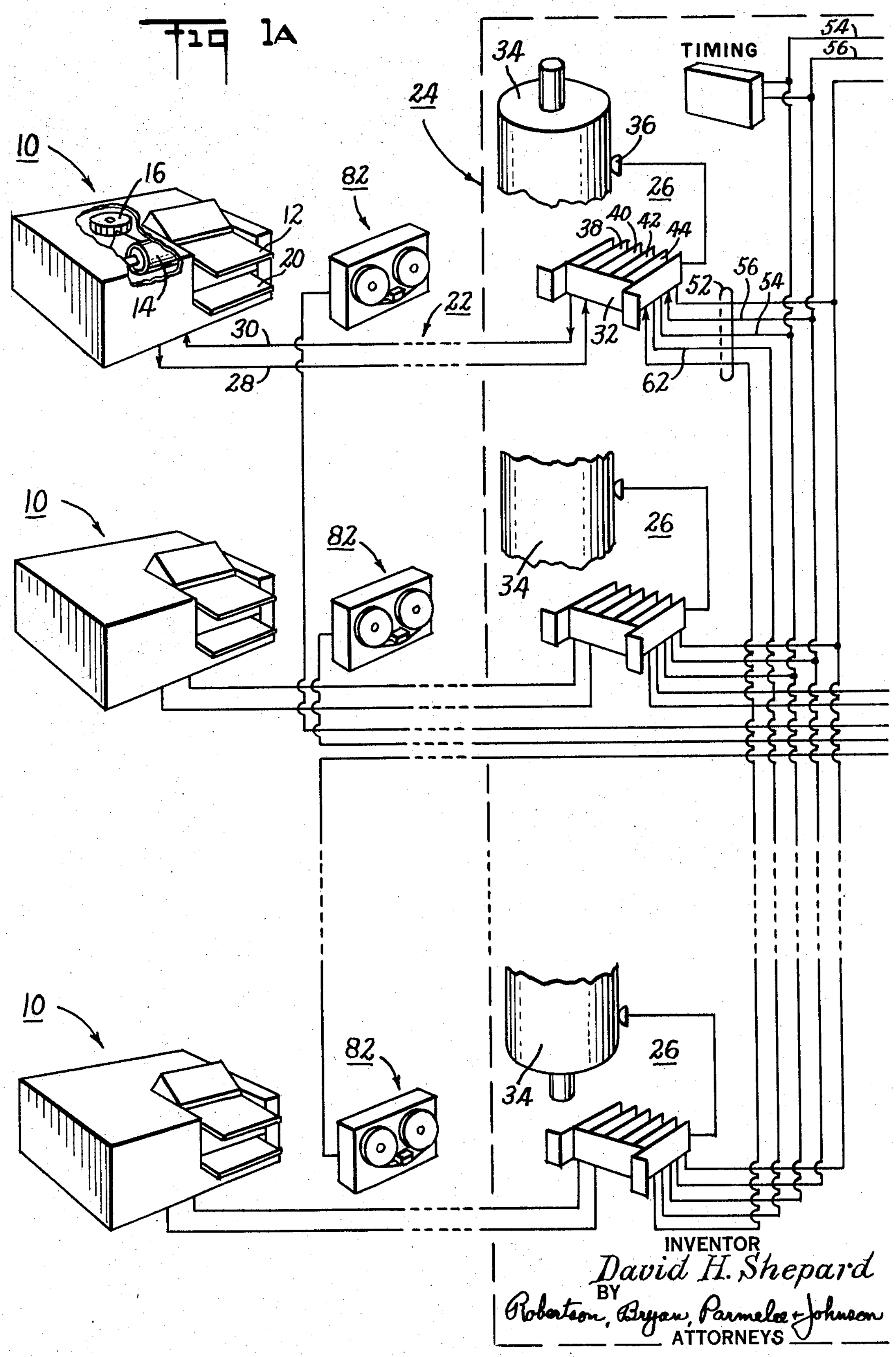
Figure 1B:
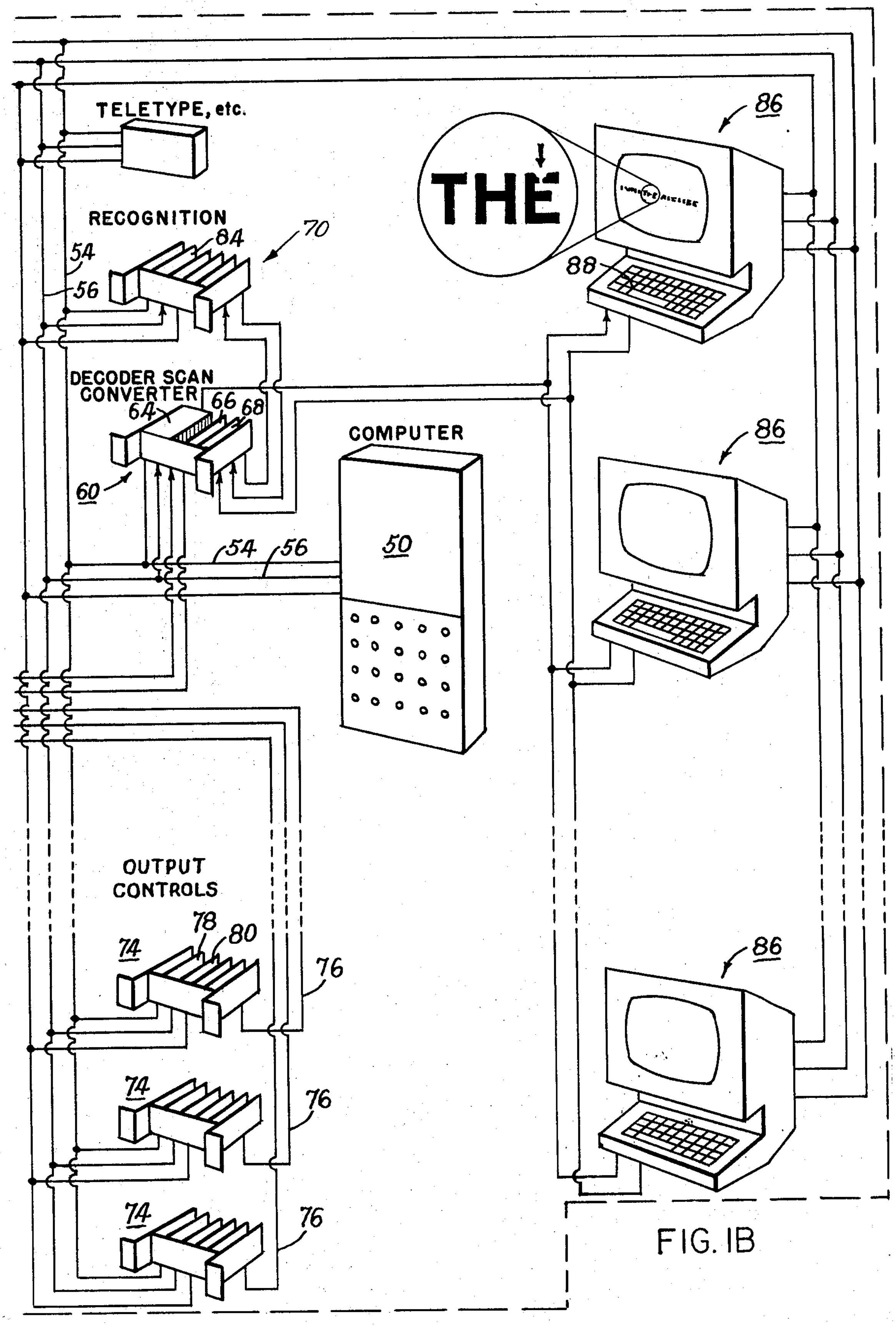

Referring now to FIG. 1, the system comprises a number of remote scanners 10 preferably of the type disclosed in copending application Ser. No. 624,445, filed Mar. 20, 1967, by E. J. Gushue and D. H. Shepard. Such a scanner is operated by inserting the document to be read into an infeed chute 12 with the lines of written characters extending from side-to-side, i.e. perpendicular to the direction of document movement. Conveying means within the scanner housing automatically grips and advances the document in a stepwise indexing movement around a drum 14 where the document is scanned with a laser light beam directed thereto by a rotating multielement mirror 16.

Figure 2:
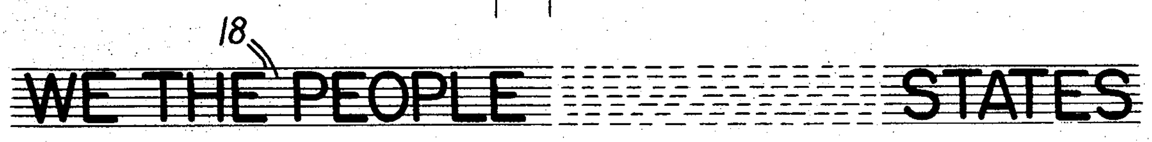
FIG. 2 illustrates the horizontal scanning of one full line of printed characters.

Between each indexing step of the drum, the light beam traverses horizontally across the document. That is, the spot of the beam passes from side-to-side along a path parallel to the lines of written characters on the document. The amount of indexing movement and the spot size on the document are so related that the spot traces out a series of contiguous horizontal paths through the line of characters, as illustrated at 18 in FIG. 2. The spot size may be about 0.005 inch in diameter, and each indexing step about 0.005 inch in length. However, coarser or finer resolution can be used, depending upon the nature of the application. In any event, the series of successive scans effectively covers all parts of the characters to be read. After scanning is complete, the document is returned to the operator by an outfeed chute 20.

The scanning of the document produces electrical signals indicating the presence or absence of character elements at certain preselected evenly spaced points along the scan path. These signals are used to generate, in a manner to be explained, code signals representing the basic scan data. These code signals are sent over a transmission circuit 22 to a central station 24 where the codes are accumulated in a corresponding line buffer 26, one for each scanner 10.

The transmission circuit 22 may include separate lines 28 and 30 for communicating in both directions. For example, the return line 30 may be used for sending a "Read" command (such as a train of short pulses) to the remote scanner 10, to cause it to start a scanning operation. The return line also can be used to send a "Hold" command to stop indexing of the drum 14, e.g., while the data for a full line of characters is being analyzed. If the data turned out to be faulty (undecipherable), the scanner could be given a command which causes it to repeat the scanning operation, in whole or in part. If the data is determined to be adequate for analysis, the line buffer can send a new "Read" command to recommence scanning.

The line buffers comprise control circuitry 32 which directs the code signals to a corresponding section of a rotating magnetic drum 34 for temporary storage while data for a complete line of characters is being accumulated. In one embodiment the drum had eight storage tracks for each remote scanner 10, with each track subdivided into 12 serial segments. In such an arrangement, the coded data preferably is placed first in a conventional recirculating shift register (illustrated by circuit board 38) operating at drum clock speed and having a storage capacity of one drum segment. When this shift register is full, and the first segment is moving into writing position under the magnetic head 36 for that track, the shift register is read out in synchronism with the drum and the codes read out are written in the first drum segment. When the segment end is reached, drum writing stops for one complete revolution, while the shift register is filled up with another set of codes. Thus, when the next empty track segment is reached after one revolution, the shift register again is read out to the drum. This sequence normally continues until all of the data for a complete line of characters is stored in the drum.

Since there is no need to store the codes representing those scans which do not intersect any characters (i.e. scans covering so-called "white space", such as between lines), the control circuitry 32 includes logic elements of known type (illustrated by circuit board 40) which in a conventional manner analyze each code as it enters the recirculating shift register 38 and function to (a) determine the presence of a special start-of-scan code signal to be described, (b) detect a certain code bit (as will be described) indicating that the code contains character data, and (c) reset the shift register to its start condition if two start-of-scan signals are received with no intervening character data codes. For example, each start-of-scan signal can be used to set a flip-flop which is reset by any received character data code; if the flip-flop is still set when a start-of-scan signal is detected, the logic elements will indicate that a "white space" scan was received. Such "white space" scans are not recorded in the sequence of drum segments.

To determine when accumulated character data codes represent a complete line of graphic characters, the control circuitry 32 also includes a conventional counter device (illustrated by circuit board 42) which counts the number of consecutive scans containing character data, i.e. the number of times a start-of-scan signal is received while the previously mentioned shift register is in reset condition. If this count is less than some predetermined number (such as 12) when the next white scan is received, the logic elements 40 automatically reset the shift register 38 on the assumption that the accumulated code data did not represent true characters. However, when a white scan is received after reaching such predetermined count, decoding and character analysis begins, on the assumption that a complete line has been received.

When logic elements 40 detect a complete line of characters, e.g. in the manner described above, means (circuit board 44) are activated to send an "interrupt" signal to a conventional high-speed stored-program computer 50 (such as one manufactured by the Digital Equipment Corporation) connected to the line buffers 26 and other peripheral devices by a data buss interconnection system generally indicated at 52. The interrupt signal from the line buffer is sent over the "interrupt and skip" busses 54 (two wires) and signifies to the computer that one of the peripheral devices is requesting action. The computer thereupon sends out on the "device selection" busses 56 (nine wires) a "roll call" identifying each of the devices in sequence by special codes. The peripheral device requiring service responds on the interrupt circuit 54 when its code is called.

The computer follows a preset stored program of steps to determine what action is required, and then to carry out such action. In the instance where a line buffer 26 signals it has a complete line of characters, the computer will order the character data transferred to a "decoder scan converter" 60 which serves all of the line buffers on a time-shared basis. Specifically, the computer sends enabling control signals to both the particular line buffer and to the decoder scan converter, and these signals serve in known fashion to open gates at both of the signalled peripherals to the "line buffer data and synch busses" 62 (two wires). The computer also sends control signals causing the line buffer to read out its stored data to the line buffer data channel while the decoding scan converter receives and places that data in storage. In one practical embodiment, such readout from the line buffer drum requires only between about 6 to 48 milliseconds, depending upon the amount of coded data needed to specify the complete line of characters.

The decoder scan converter 60 serves primarily to translate the coded data back into the basic "black-white" format represented by the original scan data. That is, the decoder functions in effect to reverse the coding procedure which was carried out at the remote scanner 10. In the preferred embodiment, as described in the above-identified parent application Ser. No. 523,367, the coding operation consists of generating a series of multibit code groups, such as 5-bit and 10-bit groups, indicating by the particular coded number the scan length between white-to-black transitions. (In a commercial apparatus based on this coding principle, the codes used may depart from exact identity between numbers of events and the corresponding code number, in order to permit assigning specific codes to certain special functions such as indicating the start of a scan. Such lack of identity can, of course, readily be compensated for by suitable arrangement of the logic circuitry used for decoding.)

The decoder scan converter 60 may utilize a drum storage decoder as disclosed in the above parent application Ser. No. 523,367. Preferably, however, it comprises a conventional multiplane magnetic core storage unit, illustrated at 64 in FIG. 1B and FIG. 11, having as many "words" of storage (shown vertical) as there are bits (or analyzed "spots") in each scan across the document. In turn, each storage "word" should have at least as many storage positions (levels) as the number of horizontal scans required to cover completely each line of printed characters. For example, with a system having, say, 1024 sample bits per scan, and wherein 36 successive contiguous scans may be required to cover the document area occupied by one complete line of characters, the core storage should have capacity for at least 1024 words of 36 bits length each. Of course, core memory units available commercially may not fit the scanning system requirements precisely, but such commercially available units can readily be adapted to provide the equivalent of the desired arrangement.

In the core storage 64 of the decoder scan converter 60 each storage bit position (level) is, in effect, assigned a corresponding position of the area encompassing the line of characters as represented by the series of contiguous scans through that line. For example, the 1024 scan "spots" of the first (top) scan through the line is represented by bits stored in the first positions of the 1024 storage words of the core unit, the spots of the second scan by bits in the second positions of the storage words, etc.

With such a core storage arrangement, decoding may be done very simply by using the received codes as the basis for determining the address for entering marked data bits in the core. Thus, the first regular code group of the first scan may be used directly as the address for the placement of a data bit representing the location of the first "white-to-black" transition encountered in the top scan of a line of characters. For example, if during the first scan of a line of characters 186 "white" spots are passed in traversing the margin from the start-of-scan to the initial contact with a character element (i.e. the first "black" spot), the first code group generated will be the number 186. When this code group is received at the decoder scan converter 60, its internal logic elements (illustrated by circuit board 66) will use number 186 as the address and place a marked bit in the top position of core storage word number 186 to indicate that a white-black transition occurred at that position.

When such a white/black transition has been produced by a "thin" character element (as will be explained subsequently), decoder logic elements 66 operate automatically to place another marked bit in the first position of word number 189, to indicate that a black/white transition occurred at that point. In this way, the horizontal thickness of a "thin" character element is standardized at three scan spot widths.

If the next white/black transition occurred 10 spot positions after the first white/black transition, the code group generated will be the number 10. Upon analysis of that code, the decoder logic elements 66 will, in a separate conventional accumulator, add 10 to the preceding white/black address (186) previously stored in the accumulator, thereby to calculate the new word address (196) where a marked bit is to be placed in the first bit position. Thus it is that all the transition-indicating bits of the first scan are placed in corresponding first positions in the 1024 words of core storage representing the entire scan length.

The storage of data from the second scan is handled in the same fashion, except that the marked bits indicating scan transitions are placed in the second position of each core storage word. Ultimately all of the data is represented by marked bits placed in selected core elements. Such bit placement effectively reconstructs the scan data in its original format, in a sense equivalent to the printed line of characters.

When the decoder scan converter 60 has decoded (and thereby stored) all of the data from one line buffer 26, it interrupts the computer 50 and sends a signal requesting readout of the core 64. The computer thereupon sends a control signal to open the appropriate gates from the common data buss 52 to the decoder scan converter and to a character recognition circuit generally indicated at 70. The computer further signals the decoder unit to read out its core to the common data buss for transfer to the recognition circuit. Transfer is accomplished in a very short time, for example, readout may require only several milliseconds.

This readout is carried out in a manner which directs to the recognition circuit a stream of data bits like that which would have been produced by a conventional optical scanner making a series of consecutive vertical sweeps through each character in sequence. That is, the first storage "word" is read out in parallel to a register (illustrated at 68) which may, for example, comprise a number of flip-flops, one for each horizontal scan level. The flip-flops then are read out in parallel to a shift register 69 (FIG. 11) which is, in turn, shifted out in serial fashion to send off the stream of corresponding video bits (ones and zeros) to the recognition circuit 70. Thereafter, the next word of storage is readout, in parallel, to the register 68, such that any marked bit (a "one") serves to change the condition of its corresponding flip-flop, whereas any unmarked bit has no effect on its flip-flop. Thus each flip-flop "remembers" each bit it receives, until a new transition is indicated by another marked bit.

Figure 3:
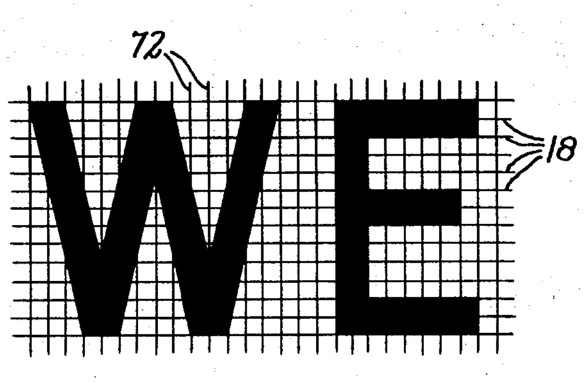
FIG. 3 illustrates the vertical readout of the reconstructed character data from the memory storage at the central station.

In this way, the data bits shifted serially out of the flip-flop register 68 provide, in effect, vertical scanning of the original graphic characters. Such vertical scanning is illustrated in FIG. 3 by showing the original horizontal scan paths 18 together with vertical traces 72 indicating the subsequent readout of the reconstructed data from the magnetic core 64. (It should be noted that although the characters are shown in FIG. 3 as solid, in actuality the character data reconstructed by the core comprise a large number of individual "spots" at the intersections of the orthogonal matrix represented by the traces 18 and 72.)

The recognition circuit 70 may be of conventional construction, for example a type such as shown in U. S. Pat. No. 2,889,535 (Rochester). This circuit analyzes the stream of data derived from the core storage 64 and produces output signals identifying each character in sequence.

These character signals are transferred over the common data buss 52 to the computer 50 and are there placed in a storage assigned the originating remote scanner 10. The computer program may provide for further processing as required. Alternatively, the computer may be programmed to transfer the character signals to one of several output control units 74 for retransfer over a line 76 to the corresponding remote station. Such output control unit may have a one-character buffer storage 78, and be provided with means 80 for signalling the computer in known fashion whenever its buffer is empty. The computer thereupon sends the next available character from storage through the common data buss 52 to the output control unit, for transmittal to the remote station.

In some applications, one or more of the remote stations may be provided with a conventional tape transport 82 to record the character signals from the central station 24. This affords relatively low cost data storage and accommodates entering the character data into a computer or other equipment at the remote station, for further processing. Other types of receiving units may, of course, be used, not necessarily at the same location as scanners 10.

At times, the character recognition circuit will be unable to analyze a set of character data, generally because the original character contained a printing defect. In accordance with a further aspect of the disclosed apparatus, when the recognition circuit 70 is unable to decipher a character, signalling means (illustrated by circuit board 84) responsive to such condition will be activated to transmit over the common data buss system 52 a special code signal to the computer 50. The computer will, in turn, signal one of several CRT viewers 86 (referred to as "reject consoles") with a code signal causing that console to be activated for presenting the entire line of characters contained in the core storage 64.

To this end, the computer 50 is arranged to send to the decoder scan converter 60 a control signal instructing the decoder to transmit the video from its core storage 64 through the common data buss 52 to the activated reject console 86. This video is developed as described above, i.e. by means of a flip-flop register to which the core storage words are transferred in parallel format such that each "transition" marked bit reverses its corresponding flip-flop, the register being read out serially between each data transfer. The development of a display of graphic characters based on the video data can be effected readily by well-known techniques. For example, the console may include a recirculating memory, such as a drum, in which the video from the core is stored for repetitive development of corresponding display signals for the CRT. In addition, the computer advantageously may be arranged to send to the reject console a control signal which activates a special symbol identifying the particular character which did not meet specifications. This is illustrated herein by an arrow pointing to the letter "E" the transmitted data for which indicated a gap in the upper arm. Each reject console also is provided with a keyboard 88 with which an attendant, after inspecting the CRT viewer, can insert the correct character simply by pressing the proper key. A corresponding machine language character signal is sent to the computer to be placed in the character storage.

It will be apparent that the reject consoles 86 can if desired be used to display the stored character data for a variety of purposes other than to examine possibly defective characters as described above. In general the CRT viewer is a useful adjunct to a time-shared character data processing equipment and can perform many functions.

Returning now to the encoding operation at the remote scanner 10, each such scanner includes optical sensing and data coding apparatus basically as disclosed in the above-identified parent U.S. Pat. application Ser. No. 523,367. Specifically, and referring to the lower left-hand corner of FIG. 4, the scanner incorporates a photocell 90 which functions to produce an electrical output signal responsive to the amount of light reflected from the document while the beam is traversing its scan path. This signal is fed to a conventional saturating amplifier 92 arranged to produce a "high" or "low" output depending upon whether the input is above or below a preset threshold. A second photocell 94 is provided to generate clock pulses as described in the above-identified U.S. Pat. copending application Ser. No. 624,445, filed Mar. 30, 1967. As described in that application the clock beam received by this second photocell is developed by deflecting a portion of the main scanning beam up at a slight angle so as to strike an elongate horizontal strip (not shown herein) carrying a series of reflective marks, e.g. 0.005 inch in width and 0.005 inch apart. Thus the light reflected from this strip is intensified when the main scanning beam is at certain corresponding uniformly-spaced positions along the scan line. The output signal from the clock photocell 94 is fed to a conventional saturating amplifier 96 which produces a corresponding series of clock pulses (collectively referred to as the "scan clock") while the light beam traverses the document.

The scan clock pulses are directed to a frequency doubler 98 to create a corresponding train of uniform (e.g. all positive-going) pulses at each clock position of the scanning beam. This pulse train is fed to a Nand gate 100 together with $\overline{\text{EOS}}$ (End-of-Scan) and $\overline{\text{SOS}}$ (Start-of-Scan) signals which are generated by a related circuit generally indicated at 101 and activated by the scan clock signals. This circuit includes a device 102 for detecting the cessation of scan clock signals, which occurs when the clock beam passes beyond the clock pulse strip referred to above. This device utilizes delay means for producing the detector output signal ("blanking") only after the scan clock pulses have ceased for a preselected time period, e.g. corresponding to two or three pulses.

This blanking signal triggers a Nand gate 103 to produce the leading edge of $\overline{\text{EOS}}$; the trailing edge of this pulse is determined by a second delay means 104 and associated gating. The trailing edge of the $\overline{\text{EOS}}$ signal in turn triggers a Step Pulse 105 which produces a signal for the motor to index the document being scanned. This Step Pulse also activates a pulse-generating circuit 106 arranged to produce the $\overline{\text{SOS}}$ pulse after a predetermined time delay. This $\overline{\text{SOS}}$ pulse occurs shortly before the start of the next scan sweep across the document, and is used to activate the various circuits associated with the encoding functions to be performed during the scan.

As mentioned hereinabove, the encoding function consists basically of developing multibit code groups representing scan distances between certain events occurring during a scan. All of the multibit codes are developed by a binary clock counter 108 shown in FIG. 5 with certain repetitive elements omitted for simplicity and clarity. This counter includes a first group of four stages (A1, B1, C1, D1) for counting up to 16, and a second group of four stages (AA1, BB1, CC1, DD1) for carrying the count up to 255 (full count). The counter also includes an intermediate stage F1 which indicates whether the count has gone beyond 16.

The counter stages are coupled to a group of output buffer stages generally indicated at 109 (consisting of D-type flip-flops) to which codes are transferred pending transmission to the central station 24. At some time prior to the start of each scan, counter 108 is reset to start condition by a pulse from a line labeled Xfer Reset. In this start condition, the first five stages (including stage F1) are all "ones", i.e. these counter stages present the code 11111. This special 5-bit code is assigned the special function of indicating the start of a scan (SOS) to the central station.

Figure 6:
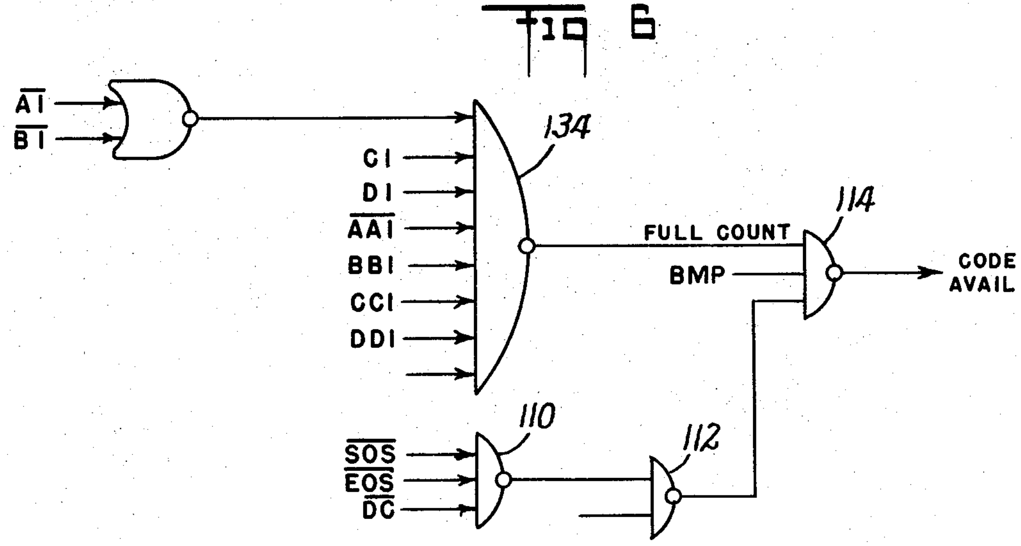

The $\overline{SOS}$ signal first is used to send off to the central station this special 5-bit code identifying the start point for the scan. Referring now to FIG. 6, the $\overline{SOS}$ pulse is fed as one input to a Nand gate 110, so that when $\overline{SOS}$ goes low just before the start of scan, the gate output goes high. This high signal is fed to an inverter 112 and thence to another Nand gate 114 the output of which goes high to signal that a code is available ("Code Avail") for transfer to the output buffers 109.

Figure 7A:
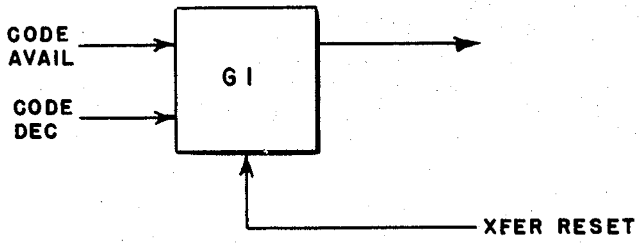
Figure 7B:
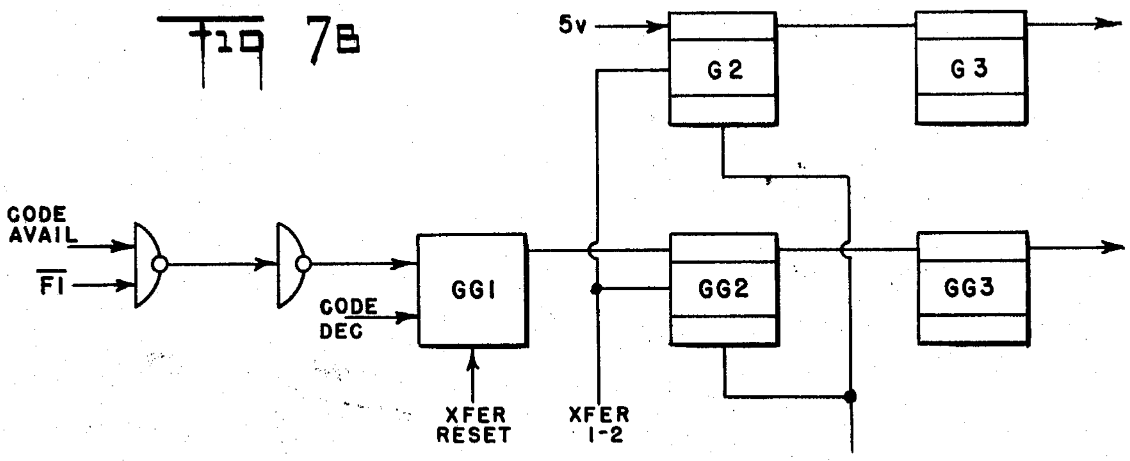

Code Avail is directed (FIG. 7A) to an Indicator Flag flip-flop (G1) which, when set by a high input, stays set until transfer of the code has been effected, in a manner to be explained subsequently. Setting of G1 also requires a trigger input called Code Decision (code Dec) which is a series of pulses synchronized with the original video clock pulses, but delayed a slight amount (about 0.5 microseconds) by a delay means, not shown. The set condition of G1 serves to indicate that there is a code awaiting transfer from the first group of stages (A1, etc. of the clock counter 108. As shown in FIG. 7B, a second Indicator Flag flip-flop GG1 is provided to indicate when there is a code awaiting transfer from the second group of stages (AA1, etc.) of the clock counter.

Figure 8:
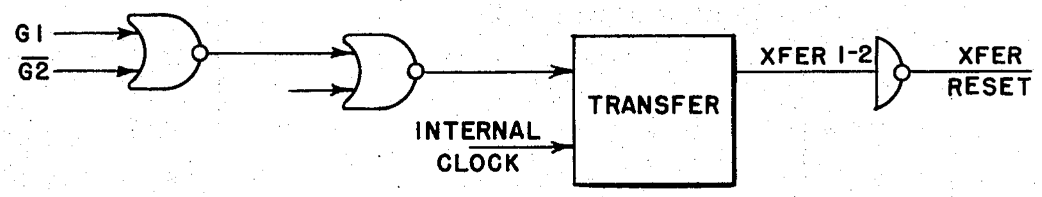

Referring now to FIG. 8, the set output of Indicator Flag flip-flop G1 (which as explained above goes high at start-of-scan) is fed as one input to a Nand gate 116 together with the reset (inverted) output $\overline{G2}$ of another Indicator Flag flip-flop G2 (shown in FIG. 7B). This latter flip-flop indicates whether the initial stage (A2, etc. of the output buffer 109 is empty and thus ready to receive a code from the binary counter. If the buffer is empty, $\overline{G2}$ will be high. With both G1 and $\overline{G2}$ high, the output of Nand gate 116 is low, and this low output is inverted and fed as the set input to a Transfer flip-flop 118 the output of which is labeled "Xfer 1—2" (transfer from storage 1 to storage 2, i.e. from clock counter 108 to buffer input).

The output of Transfer flip-flop 118 is directed (FIG. 5) to the trigger inputs of the buffer flip-flops A2, B2, etc., which are thereby enabled to take the available code from the counter 108. In the case where $\overline{SOS}$ is the command, the code transferred (11111) is contained in the first five stages A1 through F1 of the counter. (Although the remaining stages AA1, etc. transfer their contents to flip-flops AA2, etc., the bits so transferred are without significance and are subsequently discarded by control logic in the output buffer control circuitry.)

The output buffer 109 holds the transferred codes in parallel-bit configuration until they are sent over the transmission line to the central station. The particular type of buffer used forms no part of the present invention. It may be noted, however, that an advantageous buffer type is one including provisions for recirculating the bits while awaiting transfer to the transmission line. Also, although the buffer shown can accept 10-bit codes, it may be desirable to include means for merging the two 5-bit sections serially so that each 10-bit code becomes two 5-bit codes one behind the other, for transfer over a 5-wire transmission line to the central station. Alternatively, the codes may be converted to serial bits, to permit transmission over a single line.

After the start-of-scan code has been transferred to the buffer 109, the scanning beam sweeps across the document being read, while simultaneously clock pulses ("Read Clock", see FIG. 10 for development) are directed to the counter 108 so that the number (code) stored in the counter at any instant reflects distance which the scanning beam has traversed. Typically, the initial portion of the sweep after start-of-scan will produce only "white" video bits, because most documents have a margin preceding the side edge of the printing.

While the counter 108 is accumulating the number of clock pulses, the corresponding scan samples (Clocked Blk) are being supplied to the input of a 5-bit shift register 120 (FIG. 9) together with Read Clock pulses. Ultimately, the scanning beam will encounter part of a character, and will produce a "-black" video bit (usually followed by at least one or two more). This black bit is inserted in the first shift register stage I5 and, when it reaches the fourth stage I2, presents a high input to a Nand gate 122 (seen at the left-hand edge of FIG. 9). At this instant, the fifth stage I1 still will be low because it contains a zero (i.e. a "white" bit), and thus the other input $\overline{I1}$ to Nand gate 122 also will be high. In this circumstance, the gate output will go low to cause the output of the following Nand gate 124 to go high. This high signal is fed to the set input of a Data Change flip-flop the reset output $\overline{DC}$ of which goes low at the next Read Clock, i.e. when the black bit detected in the fourth stage is shifted to the fifth stage I1.

Reverting to FIG. 6, $\overline{DC}$ also is applied as one of the inputs to the Nand gate 110 so that when $\overline{DC}$ goes low, the output Code Avail of this circuit is made high to initiate a data transfer to the output buffers 109. A detailed description of this transfer operation is set forth hereinabove.

As mentioned previously, the clock counter 108 is adapted to generate either a 5-bit code or a 10-bit code, depending upon the number of consecutive video bits of the same type (white or black) developed as the scan proceeds. If the count reaches the maximum which can be handled by the first four stages, the fifth stage F1 will be reset to indicate that the complete scan length is not represented by the first four code bits. The counter continues to accumulate the number of clock pulses received (up to a maximum of 255 in the disclosed embodiment), and if a black bit is detected by the shift register 120 before the maximum count is reached, a 10-bit code will be transferred to the output buffer.

The fifth and tenth bit of a 10-bit code are generated by the same flip-flop, F1, using the reset and set outputs respectively. When F1 is reset by the count going beyond the first four stages, its reset output presents through a Nor gate 130 a "-zero" to the output buffer stage F2, indicating that more than the first four bits of the count are required to specify the scan length. However, the set output of F1 presents through another Nor gate 132 a "one" to the tenth output buffer stage FF2, indicating that the complete count is contained within the 10-bit code.

If the clock count goes to the maximum capacity of the counter 108, both the fifth and tenth stages of the output buffer are made "zero". Such full count is detected (FIG. 6) by a Nand gate 134 which produces a low "Full Count" output for the succeeding gate 114 to generate Code Avail. The Full Count signal is directed (see FIG. 5) to the set input of an Indicator Cancel flip-flop, the output of which goes high to produce zeros for the fifth and tenth output buffer stages F2 and FF2. At the same time, the Code Avail signal causes the counter contents to be transferred to the output buffers 109, as previously described.

It may be noted that the same sequence of events occurs if the end-of-scan is reached while the counter is still counting. That is, $\overline{EOS}$ sets the Indicator Cancel flip-flop (FIG. 5) and also is applied to Nand gate 110 (FIG. 6) to produce Code Avail for making a code transfer to the output buffers 109.

Figure 9:
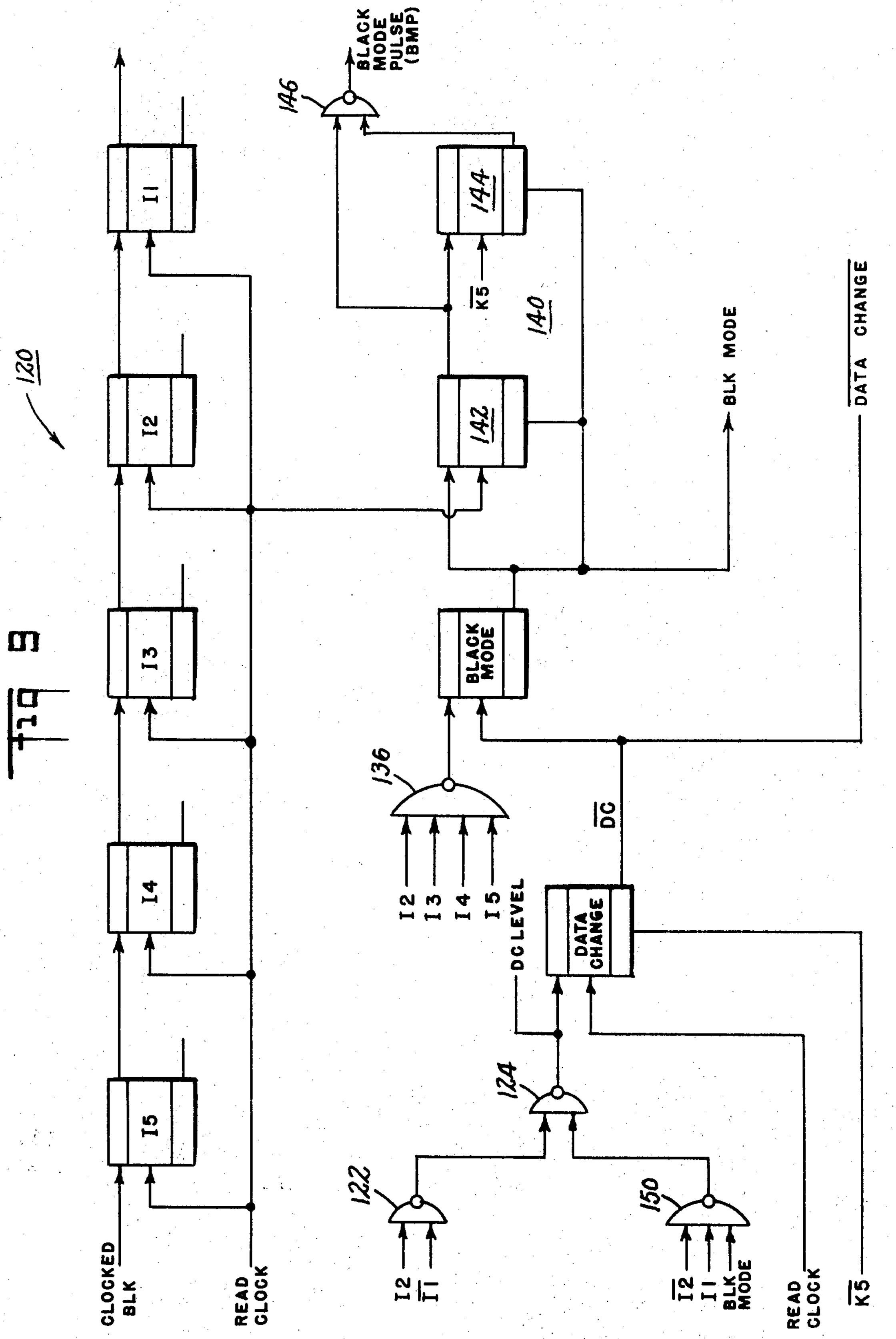

The coding procedures described above serve in effect to define the scan distance between successive "white-to-black" transitions during scanning by the light beam. Such an arrangement is appropriate when the scanned character portions are relatively thin vertical (or slightly tilted) elements, because the width of the black portion in that case is not a vital factor in character recognition. However, when the number of successive black bits is relatively great (referred to as a "long black") it is desirable to encode the number of black bits, rather than the distance between white-to-black transitions. Such a "long black" condition is detected (FIG. 9)

by a Nand gate 136 which checks the first four shift register stages (I2—I5) for black bits. If all contain black bits when a black bit is shifted into the fifth stage, then the gate output goes low to reset a Black Mode flip-flop. This flip-flop is triggered by $\overline{DC}$, which goes high to serve as a trigger when the Data Change flip-flop is reset (cleared) by $\overline{K5}$. This latter signal comprises a train of pulses synchronized with Read Clock, but delayed about 0.5 microseconds.

The reset output of the Black Mode flip-flop is directed to a pulse-forming circuit 140 comprising a pair of flip-flops 142 and 144 which operate together with a Nand gate 146 to produce a black-mode pulse (BMP) one clock pulse after the Black Mode flip-flop is set. BMP stays high for about one-half a clock time, and serves to produce Code Avail (see FIG. 6), thereby to transfer a code from the clock counter 108 to the output buffers 109. The code in the counter at this time is 00001, because one clock has occurred since the counter was reset to 11111 by setting of the Data Change flip-flop. This code is assigned the function of indicating to the control equipment at the central station 24 that the codes to follow represent the scan length of consecutive "black" samples. After transfer of this special black-mode code, the counter 108 is reset to its start condition by logic circuitry responsive to Code Avail, as previously described, and the counter starts counting clock pulses corresponding to the black sample bits.

The next "white" bit to reach the fourth stage I2 of the shift register while the system is in "black mode" is detected by a Nand gate 150 (FIG. 9) the output of which sets the Data Change flip-flop. When this flip-flop is reset immediately thereafter ($\overline{K5}$), it triggers the Black Mode flip-flop back to its normal (nonblack mode) condition, because at trigger time the output of Nand gate 136 will be high, i.e. not all of the first four shift register stages will contain black bits.

Setting of the Data Change flip-flop at the end of black-mode condition transfers the code then in the counter 108 to the output buffers 109, and also resets the counter, all as previously described. Thereafter, the counter will resume counting clock pulses, but this time the code count will represent the number of "white" scan samples following the last "black" sample. This condition of the system is referred to as the "transition" mode. If another black bit enters the shift register 120 before the end of scan, this will be detected in the manner described hereinabove. Thereupon, the code count will be transferred to the output buffers, and the counter will be reset to initiate another count in the "white" mode, i.e. wherein the code count represents the number of scan samples between successive white-to-black transitions.

When the end of scan is reached, the $\overline{EOS}$ signal will generate a corresponding Code Avail (see FIG. 6), the code then in the counter 108 will be transferred to the output buffers 109 as previously described, and the counter will be reset. $\overline{EOS}$ also is directed to the Indicator Cancel flip-flop (FIG. 5) to make both the fifth and tenth bits of the transferred code zero, thus indicating to the central station 24 that the code does not represent the scan distance to a white/black transition.

Figure 4:
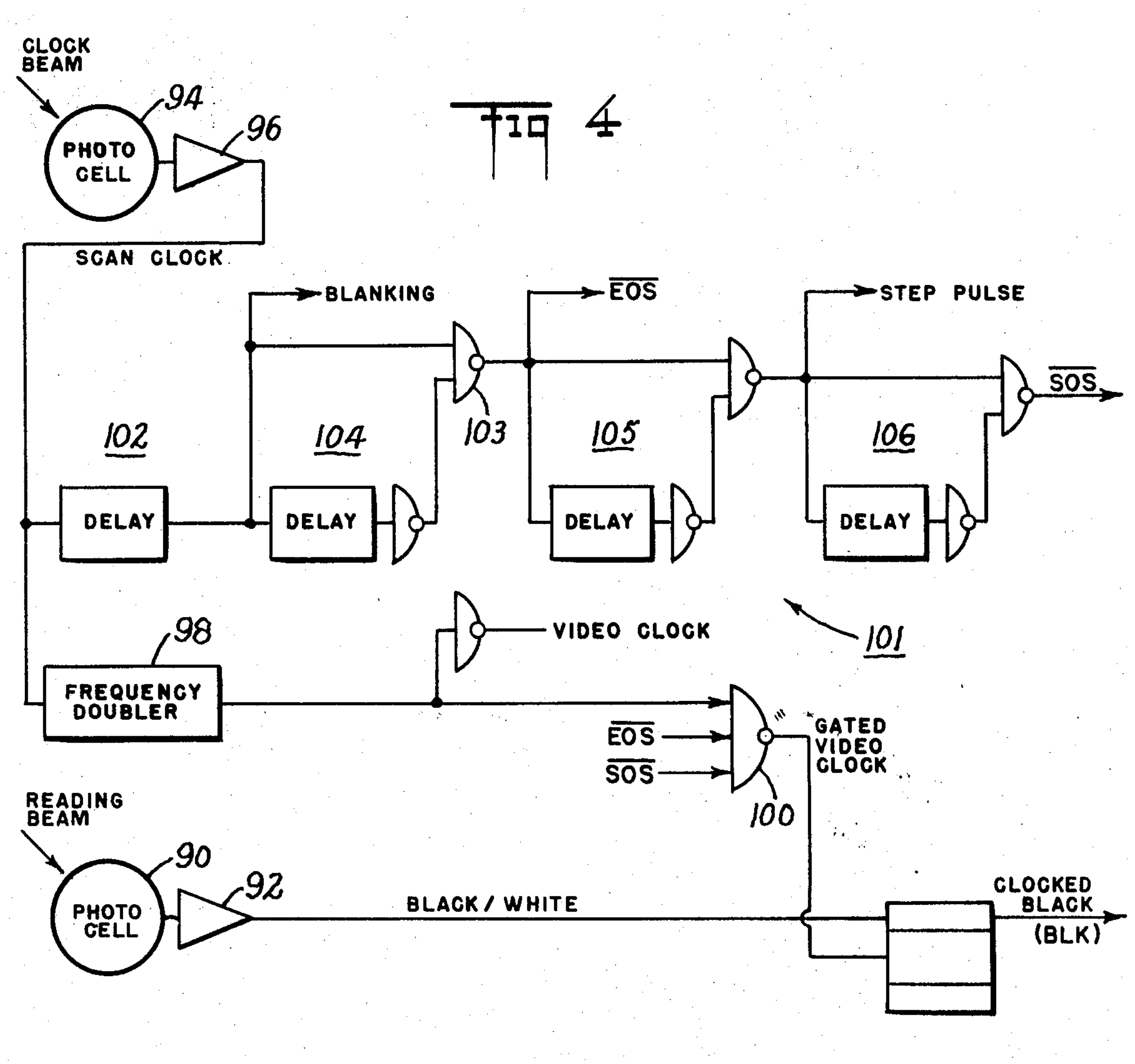
FIG. 4 shows diagrammatically certain features of the remote scanner, including electronic circuitry for producing "clocked" scan data.

Immediately at the end of $\overline{EOS}$, the timing circuits of FIG. 4 produce the Step Pulse. This is directed to the indexing motor for the document drum 14, and serves to advance the document one increment as explained in the above-identified copending application Ser. No. 624,445. Thereafter, the start-of-scan signal $\overline{SOS}$ is generated just before the next sweep of the light beam across the document, and the encoding sequence described hereinafter is reinitiated.

If the scanning path crosses a large number of character elements, the rate of formation of code groups may exceed the rate at which the code groups can be sent over the transmission line to the central station. The output buffer 109 will fill up, and ultimately there will be a code awaiting transfer from the counter 108 when the initial output buffer stages A2, etc., still contain a code. Thus, when G1 (FIG. 7A) is set to start a code transfer, G2 will still be high and therefore the Transfer flip-flop (FIG. 8) cannot set because $\overline{G2}$ is low. Accordingly, no code transfer can take place.

Under these circumstances (referring now to FIG. 10), a Nand gate 150 responds to G1 and G2 to set a Halt flip-flop 154 at the next Code Dec time. The set output of the Halt flip-flop is inverted to close a Nand gate 152 to turn off Read Clock. This deactivates (freezes) the clock counter 108, to prevent any change in the code stored in the counter. The codes already in the output buffers 109 will be transferred to the transmission line 28, and ultimately the initial buffer stages A2, etc., will become available for a new code. When this occurs, G2 goes low, and the accumulated code in the counter 108 is shifted to the buffers 109 and the counter is reset. However, counting does not resume until the Halt flip-flop is reset. Similarly, indexing of the document is prevented during this period by the reset output of the Halt flip-flop.

To control the time for resetting of the Halt flip-flop, its set output activates a Halt Counter 156 (FIG. 10). This counter receives Halt Clock pulses which are slightly delayed video clock pulses produced only while the Halt flip-flop is set. When counter 156 reaches a predetermined count (preset to be the number of samples taken in one scan), it produces an output trigger on line 158 to reset the Halt flip-flop. Thus, Read Clock pulses are reactivated to start counting by the counter 108. The new count starts at the scan position where the "halt" originally occurred, so that no scan information is lost.

Transmission of the data to the central station 24 is facilitated by modifying the data during the encoding process in accordance with predetermined rules. For example, it will be noted that in the coding technique disclosed above the coded number defining the distance between two white-black transitions does not indicate how many black bits actually were sensed, i.e. the same code is transmitted for any number of black bits from one through four. This simplification of the data reduces the transmission requirements substantially without substantial loss of character information. The leading edges of the characters are transmitted faithfully, assuring recognition of curves which are important in the differentiation of certain characters.

Although when operating in "white" mode, only the white/black transitions are identified by the incoming data, the magnetic core storage unit 64 nevertheless is supplied, as mentioned above, with a data bit marking a subsequent black/white transition three scan "spots" after the white/black transition. When the core is read out, these marked bits translate as a character element having a standard width of three scan spots, i.e. about 0.015 inch, even though the actual width of the element might be somewhat different.

Of course, if the sensing unit at the remote scanner 10 produces a black bit followed by less than three white bits before the next black bit, it would not be appropriate to convert the first black bit to a character element three black bits wide, because this would create an overlap. Thus for such circumstances the circuitry includes conventional logic means (not shown) to treat the first black bit either as two black bits (if there had been two white bits following) or as a single black bit (if there had been only a single following white bit).

Figure 5:
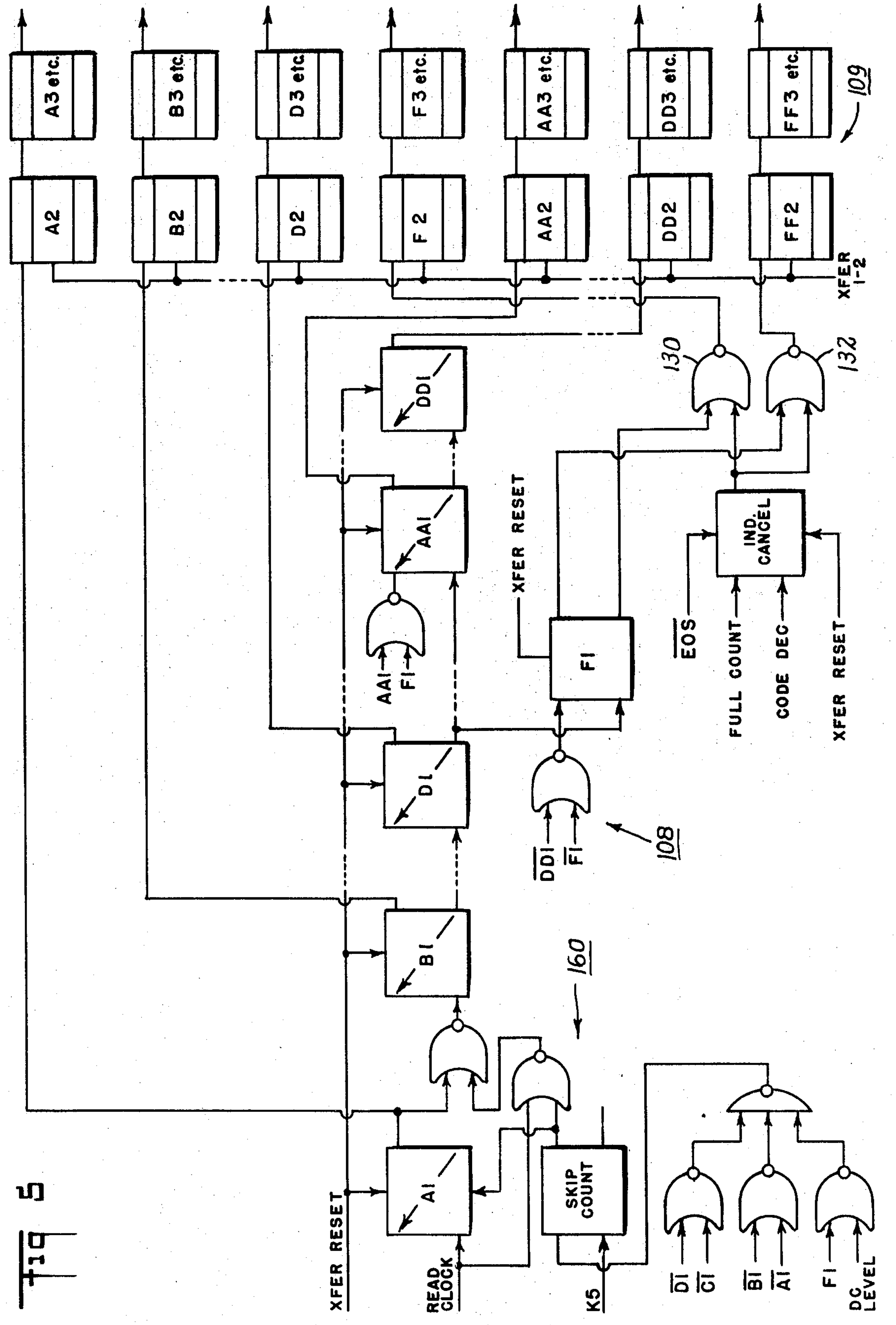

When one of the codes is assigned a special function (such as code 11111 for start-of-scan), the counter 108 should be arranged to skip that code during its normal counting operation. This function can be produced in any conventional manner, as is illustrated in FIG. 5 by the gating and flip-flop control circuitry generally indicated at 160.

Although a preferred embodiment of the invention has been set forth in detail, it is desired to emphasize that this is not intended to be exhaustive or necessarily limitative; on the contrary, the showing herein is for the purpose of illustrating the invention and thus to enable others skilled in the art to adapt the invention in such ways as meet the requirements of particular applications, it being understood that various modifications may be made without departing from the scope of the invention as limited by the prior art.

I claim:

1. The method of reading graphic characters on a document bearing characters in line format, comprising the steps of:

scanning the document in a series of consecutive closely adjacent sweeps parallel to and completely traversing the line of characters to be read, the number of such successive sweeps being sufficient to scan in their entirety all of said characters in that line;

developing from said scanning operation binary scan signals indicating the instantaneous amount of light reflected from predetermined positions along the scan path;

transmitting to a receiving station data signals corresponding to said scan signals;

storing said data signals in a buffer at said receiving station until data is accumulated representing all of said characters in said line;

reading out such accumulated data signals to produce a series of sequences of binary data bits representing a series of vertical sweeps through said characters in said line; and analyzing said series of sequences of data bits to produce output signals identifying each of the characters in the line.

2. The method of reading graphic characters on a document bearing characters in line format, comprising the steps of:

scanning the document in a series of consecutive closely adjacent sweeps parallel to and completely traversing the line of characters to be read, the number of such successive sweeps being sufficient to scan in their entirety all of said characters in that line;

developing from said scanning operation binary scan signals indicating the instantaneous amount of light reflected from predetermined positions along the scan path;

transmitting to a receiving station data signals corresponding to said scan signals;

storing said data signals in a buffer at said receiving station until data is accumulated representing all of said characters in said line;

reading out such accumulated data signals representing said line to produce a sequence of binary data bits;

analyzing said sequence of data bits to produce output signals identifying each of the characters in the line; and utilizing said accumulated data to develop a visual image display of said line of characters as represented by the stored data whenever said analysis is unable to recognize any of the characters in the line.

3. The method of reading graphic characters on documents at a plurality of separated locations, each document bearing characters in line format, said method comprising the steps of:

simultaneously scanning documents at said separated locations in a series of consecutive closely adjacent sweeps parallel to and completely traversing each line of characters to be read, the number of such successive sweeps being sufficient to scan in their entirety all of said characters in each such line;

simultaneously developing from said scanning operations binary scan signals indicating the instantaneous amount of light reflected from predetermined positions along the scan paths;

simultaneously transmitting from all of said locations to a central receiving station data signals corresponding to said scan signals;

storing the data signals from each location in a respective buffer at said receiving station;

reading out any buffer in which has been accumulated data signals representing a complete line of characters to be read, thereby to produce a corresponding sequence of binary data bits;

analyzing said sequence of data bits to produce output signals identifying each of the characters in the line;

determining when any of characters cannot be identified from the read out stream of data bits; and utilizing said accumulated data signals in the buffer to produce a visual image display of all of the characters in said line as represented by the stored data signals.

4. The method of reading graphic characters on a document bearing characters in line format, comprising the steps of:

scanning the document with consecutive, closely adjacent scanning-spot sweeps defining a series of parallel scan paths which are uniformly spaced and which completely cover the area occupied by the line of characters to be read, the center-to-center spacing between consecutive scan paths being uniform and at least approximately equal to the size of the scanning spot, the number of such successive sweeps being sufficient to scan in their entirety all of said characters in that line;

developing from said scanning operation binary scan sample signals indicating the presence or absence of character elements at uniformly-spaced sample points along each scan path, the sample points in the successive scan paths being aligned so that the scan sample signals for the complete series of scanning sweeps reflects the presence or absence of character elements at the intersections of an orthogonal matrix encompassing all of the characters to be read in the line being scanned;

transmitting to a receiving station data signals corresponding to said scan signals;

storing said data signals in a buffer at said receiving station until data is accumulated representing all of said characters in said line;

reading out such accumulated data signals representing said line of characters;

analyzing said accumulated data signals to produce output signals identifying individually each of the characters in the line;

determining when any of said characters cannot be identified by analysis of the information in said data signals; and utilizing signals derived from said accumulated data signals to develop a visual image display of said entire line of characters as represented by the stored data signals whenever said analysis is unable to recognize any of the characters in the line.

5. A method of reading characters wherein the documents bearing characters are scanned at one location to produce scan signals which are analyzed at another location, comprising the steps of:

scanning the document in a series of closely adjacent paths by a scanning spot substantially smaller than the character height;

developing clock pulses at positions along each scan path;

producing binary video signals under control of said clock pulses to indicate the presence or absence of character elements at said positions;

storing in a buffer output signals corresponding to said video signals;

transmitting the output signals from said buffer to a remote station for analysis to determine the scanned characters; and temporarily interrupting said scanning function whenever said buffer contains more than a predetermined amount of said output signals awaiting transmission to said remote station.

6. The method of claim 5, wherein the documents bear characters in line format, said scan paths being scanned in sequential succession parallel to and completely traversing the line of characters to be read;

said clock pulses being developed at predetermined fixed uniformly spaced positions which are identical for each scan path; and the scanning function being interrupted by preventing the scanning spot from advancing from the scan path then being traversed to the next scan path in the sequence.

7. The method of claim 6, wherein the scanning function also is interrupted by preventing the development of any further output signals at the instant in the scan when the buffer storage exceeds the predetermined amount;

retaining in storage data identifying the part of the scan where the development of output signals stopped; and resuming the development of output signals during a subsequent scan and at the part thereof identified by said stored data.

8. An optical character recognition system comprising:

a central station having high-speed data handling apparatus including character recognition portions organized to effect analysis of scan data to develop output signals identifying individual characters;

a plurality of optical scanning devices remote from said central station to examine documents at separate locations and provide video signals corresponding to the individual characters on the documents for the central station to analyze;

means at each scanning device to encode said video signals to provide coded scan data signals containing the original scan data but capable of transmission through a limited band-width transmission channel in less time than would be required for the transmission through such channel of said video signals;

limited band-width transmission channels operatively connected with said scanning devices to transmit said coded scan data signals to said central station;

signal storage means at said central station having a plurality of separate sections;

means at said central station coupled to said transmission channels and operable to store the coded scan data signals developed at each remote scanning device in a corresponding section of said signal storage means assigned to such remote scanning device; and means at said central station for retrieving the coded scan data signals from said sections of said temporary storage means and for decoding said scan data signals to reconstruct the original scan data for analysis by said character recognition portions of said data handling apparatus.

9. In a character reading system of the type comprising a first station having a data processing system organized for character signal analysis and coupled to a second station comprising means to receive and support a document to be scanned; scanning means operable to scan said document, said scanning means including means for irradiating said document and for detecting the amount of radiation reflected therefrom at the scanned regions; advancing means to effect relative movement between said scanning means and said document in a direction perpendicular to said scan path; activating means normally operative to activate said advancing means to trace successive parallel scan lines across the document; means for developing binary signal pulses indicating the amount of radiation reflected from said document at corresponding positions along said scan lines; means for producing data signals corresponding to said binary signals; buffer means for storing said data signals; transmission circuit means coupled to the output of said buffer means to direct said data signals to said first station so that the data signals may be analyzed to determine the characters on the document; and control means operable, upon the accumulation of a predetermined amount of untransmitted data signals at said buffer means, to interrupt said activating means so as to prevent operation of said advancing means.

10. Apparatus as claimed in claim 9, wherein said control means also is operable to stop the development of further coded data during the remainder of a particular scanning sweep after said predetermined amount of coded data is accumulated; said scanning means being operable to retrace said particular scanning sweep to generate coded signals corresponding to said remainder of said scanning sweep.

11. Apparatus as claimed in claim 10, including pulse-generating means for producing clock pulses at preselected uniformly spaced positions along the scanning path so as to permit developing sample pulses indicating the reflected radiation at such positions; said positions being the same for every scan so as to assure that the retracing of any scan line will develop substantially the same sample pulses as an original scan.

12. Apparatus as claimed in claim 9, wherein the system comprises a plurality of said second stations connected to said first station by respective transmission circuit means; each second station further including converter means responsive to the binary scan signals and operable to produce coded data signals capable of transmission with reduced band-width requirements.

13. In a character reading system of the type comprising a central station, a plurality of remote units each having means to receive a document bearing characters to be read; scan means forming part of each remote unit and arranged to trace scan paths on the document and to produce sequential sample signals indicating the presence or absence of character elements at points along each path; and circuit means at each of said remote units responsive to said sample signals and operable to produce corresponding output signals suitable for transmission to said central station;

that improvement wherein said system comprises: a plurality of simultaneously operable signal channels for said remote units respectively for directing the output signals of all of said remote units concurrently to said central station; said central station including a plurality of functionally independent and simultaneously operable temporary storage means each assigned to one of said remote units respectively; control means at said central station for said temporary storage means, said control means including means coupled to said signal channels for directing the signals received from said channels to the respective temporary storage means assigned thereto, whereby the remote scanner units can be operated concurrently to develop and send respective output signals over the corresponding signal channels simultaneously so as to provide efficient utilization of the remote units and the signal channels; and character recognition means at said central station operable on a time-sharing basis to receive from any one of said temporary storage means signals representing accumulated scan data for any one remote unit when such accumulated data is a predetermined increment representing at least one complete character, said character recognition means serving to analyze such signals to produce corresponding signals identifying each individual character of the scanned documents.

14. Apparatus as claimed in claim 13, wherein said circuit means at each remote unit includes coding means to convert the sequential sample signals to corresponding coded output signals containing the essence of the scan data needed for character recognition but capable of being transmitted through said signal channels in less time than would be required to transmit the data in its original sample signal form, said central station including means to decode said coded output signals and to reconstruct the original scan data in its sequential format.

15. Apparatus as claimed in claim 14, wherein said remote units include pulse generating means producing clock pulses synchronized with the scan displacement with respect to the document being read; said coding means comprising a binary counter coupled to the output of said pulse generating means and arranged to produce a binary number corresponding to the number of clock pulses received; and means operable by said scan means for controlling the function of said counter in response to the sensing of transitions between the presence or absence of character elements while scanning the document.

16. Apparatus as claimed in claim 13, wherein each remote scanner unit includes means defining a document receiving region having parallel sides, said scan means serving to trace scan paths extending from one side of said region to the other, whereby when the document is properly oriented in said receiving region with a line of characters extending perpendicularly to said sides said scan paths will sweep parallel to and through the line of characters to intersect each character in sequence;

said circuit means at each remote unit including means to produce signals identifying each segment of said output signals which represents the data from a full scan path;

said control means at the central station including means responsive to the signals received from said signal channels to detect when scan data representing scan paths covering a complete line of characters has been accumulated in any of said temporary storage means; and means for directing such accumulated scan data signals to said character recognition means.

17. Apparatus as claimed in claim 16, including a graphic image display device;

means coupled to said character recognition means for sensing whenever said recognition means is unable to read a character, said sensing means serving to transmit to said image display device all of the character data signals stored in the temporary storage means containing the undeterminable character;

said display device serving to present images representing all of the stored characters in the complete line of characters.

UNITED STATES PATENT OFFICE
CERTIFICATE OF CORRECTION

Patent No. 3,582,884 Dated June 1, 1971

Inventor(s) David H. Shepard

It is certified that error appears in the above-identified patent and that said Letters Patent are hereby corrected as shown below:

On the cover sheet,

"[54] READING MULTIPLE-SCANNER CHARACTER SYSTEM" should read -- [54] MULTIPLE-SCANNER CHARACTER READING SYSTEM --.

Signed and sealed this 11th day of April 1972.

(SEAL)
Attest:

EDWARD M.FLETCHER,JR.
Attesting Officer

ROBERT GOTTSCHALK
Commissioner of Patents

UNITED STATES PATENT OFFICE
CERTIFICATE OF CORRECTION

Patent No. 3,582,884 Dated June 1, 1971

Inventor(s) David H. Shepard

It is certified that error appears in the above-identified patent and that said Letters Patent are hereby corrected as shown below:

On the cover sheet [73] "Congnitronics Corporation" should read -- Cognitronics Corporation --. Column 13, claim 10 should read as follows:

10. Apparatus as claimed in Claim 9, wherein said control means also is operable to stop presenting to the buffer further data signals during the remainder of a particular scanning sweep after said predetermined amount of data signals is accumulated; said scanning means being operable subsequently to retrace said particular scanning sweep to generate data signals corresponding to said remainder of said scanning sweep.

Signed and sealed this 6th day of February 1973.

(SEAL)
Attest:

EDWARD M.FLETCHER,JR.
Attesting Officer

ROBERT GOTTSCHALK
Commissioner of Patents